(12) United States Patent
Chen et al.

(10) Patent No.: US 7,836,749 B2
(45) Date of Patent: Nov. 23, 2010

(54) SLED BUCK TESTING SYSTEM

(75) Inventors: Weigang Chen, Canton, MI (US);
Baohua Xiao, Canton, MI (US); James Cheng, Troy, MI (US); Krishnakanth Aekbote, Farmington Hills, MI (US); Michael Stiyer, Grosse Pointe Farms, MI (US)

(73) Assignee: Ford Motor Company, Dearborn, MI (US)

( * ) Notice: Subject to any disclaimer, the term of this patent is extended or adjusted under 35 U.S.C. 154(b) by 419 days.

(21) Appl. No.: 11/565,855

(22) Filed: Dec. 1, 2006

(65) Prior Publication Data
US 2008/0034902 A1 Feb. 14, 2008

Related U.S. Application Data

(60) Provisional application No. 60/821,859, filed on Aug. 9, 2006, provisional application No. 60/821,862, filed on Aug. 9, 2006.

(51) Int. Cl.
*G01M 7/08* (2006.01)
(52) U.S. Cl. ...................... 73/12.04; 73/865.3
(58) Field of Classification Search ............. 73/12.04, 73/865.3
See application file for complete search history.

(56) References Cited

U.S. PATENT DOCUMENTS

| | | | |
|---|---|---|---|
| 5,483,845 A | 1/1996 | Stein et al. | |
| 5,929,348 A | 7/1999 | Stein et al. | |
| 6,256,601 B1 | 7/2001 | Wipasuramonton et al. | |
| 6,622,541 B2 | 9/2003 | Stein et al. | |
| 7,373,801 B2 | 5/2008 | Friedman et al. | |
| 2002/0050179 A1* | 5/2002 | Buescher et al. | 73/865.6 |
| 2004/0168503 A1* | 9/2004 | Kojima et al. | 73/12.01 |
| 2005/0081656 A1* | 4/2005 | Saari et al. | 73/865.3 |

OTHER PUBLICATIONS

Amendment after non-final rejection in U.S. Appl. No. 11/565,860, filed Feb. 10, 2009.
Non-final rejection in U.S. Appl. No. 11/565,860, mailed Jan. 21, 2009.
Amendment after non-final rejection in U.S. Appl. No. 11/565,860, filed Oct. 28, 2008.
Non-final rejection in U.S. Appl. No. 11/565,860, mailed Aug. 5, 2008.

* cited by examiner

*Primary Examiner*—Hezron Williams
*Assistant Examiner*—Nashmiya Fayyaz
(74) *Attorney, Agent, or Firm*—Frank A. MacKenzie; Brooks Kushman P.C.

(57) ABSTRACT

A sled carriage is configured to move in a direction of an axis. A platform is attached with the sled carriage and a sled buck is attached with the platform. Upon acceleration of the sled carriage, the sled buck and platform move relative to the sled carriage.

11 Claims, 9 Drawing Sheets

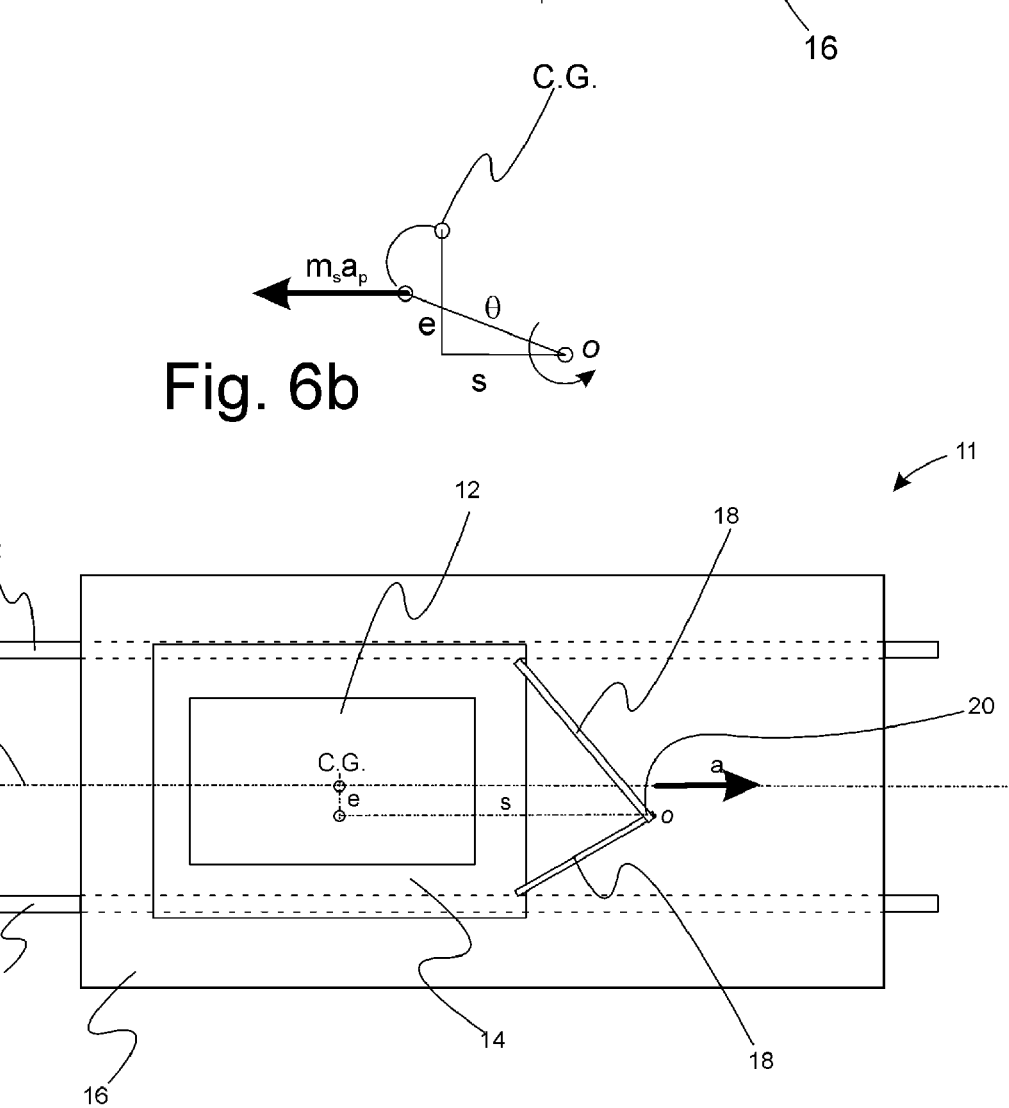

SLED BUCK TESTING SYSTEM

CROSS-REFERENCE TO RELATED APPLICATIONS

This application claims the benefit of U.S. provisional application Ser. No. 60/821,859 filed Aug. 9, 2006, and U.S. provisional application 60/821,862 filed Aug. 9, 2006.

This application is related to an application filed concurrently also entitled "Sled Buck Testing System," Ser. No. 11/565,860, now (U.S. Pat. No. 7,610,792), the contents of which are incorporated in their entirety by reference herein.

BACKGROUND OF THE INVENTION

1. Field of the Invention

The invention relates to sled buck testing systems.

2. Background Discussion

A vehicle experiencing an impact barrier test, where the barrier is at an angle relative to the direction of motion, e.g., longitudinal motion, of the vehicle, may experience longitudinal deceleration, lateral movement, and yaw movement.

Some sled buck testing systems used to simulate vehicle impact barrier tests may only permit longitudinal movement.

A sled buck testing system is desired that permits lateral movement and yaw movement.

SUMMARY OF THE INVENTION

Embodiments of the invention may take the form of a system for sled buck testing. The system includes a sled carriage configured to move in a direction of an axis, a platform associated with the sled carriage, and a sled buck attached with the platform. A first arm is attached with the platform such that, upon acceleration of the sled carriage, the sled buck and platform move relative to the sled carriage in a predetermined fashion.

Embodiments of the invention make take the form of a system for sled buck testing. The system includes a sled carriage configured to move in a direction of an axis, a curved rail attached with the sled carriage, and a platform configured to move, upon acceleration of the sled carriage, relative to the sled carriage via the curved rail in a predetermined fashion. A sled buck is attached with the platform.

BRIEF DESCRIPTION OF THE DRAWINGS

FIGS. 6a and 6b show models of the movement and the forces acting on a sled buck testing system.

FIG. 7 shows a plan view of a pivoting arm sled buck testing system in accordance with an embodiment of the invention.

FIG. 8b shows an assembled perspective view of the pivoting arm sled buck testing system of FIG. 8a.

FIG. 10b shows an assembled perspective view of the curved rail sled buck testing system of FIG. 10a.

DETAILED DESCRIPTION OF EMBODIMENTS OF THE INVENTION

Figure 1B:
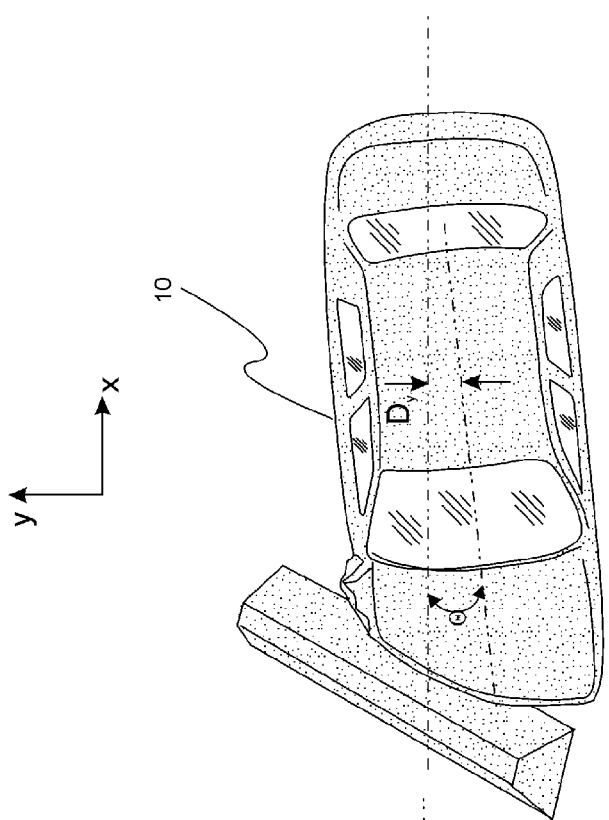
FIGS. 1a and 1b show the movement of a vehicle before and after an impact barrier test.
Figure 1A:
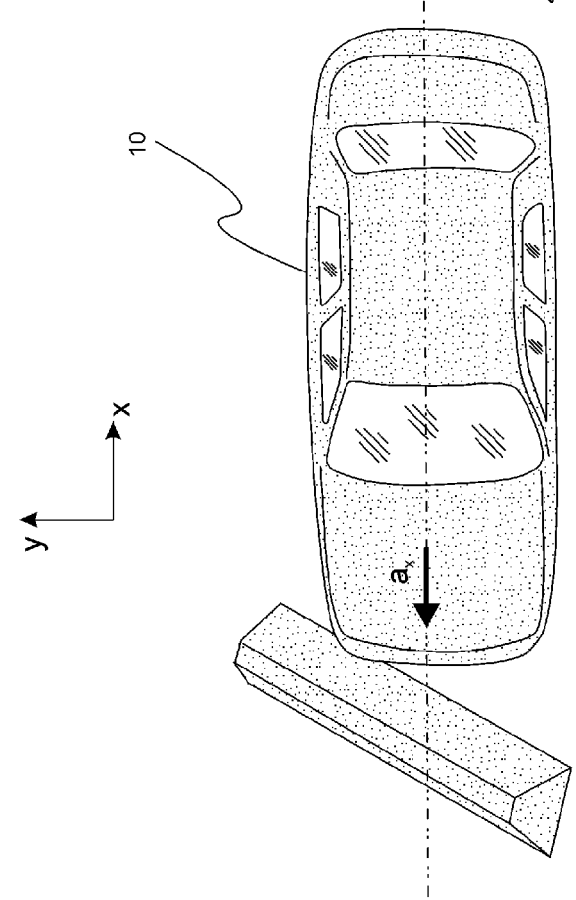

FIG. 1a shows vehicle 10 experiencing longitudinal acceleration, $\alpha_x$, in an X-Y plane prior to a 30 degree impact. FIG. 2a shows that, after impact, vehicle 10 experienced lateral movement, $D_y$, and yaw movement, $\theta$.

Figure 2:
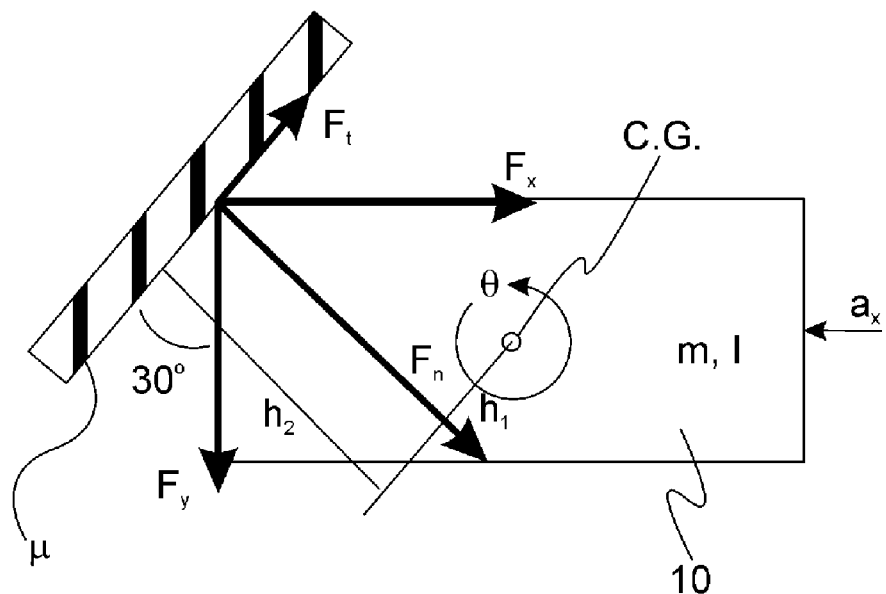
FIG. 2 shows a model of the forces acting on the vehicle of FIGS. 1a and 1b.

FIG. 2 shows a rigid body model of vehicle 10, where

C.G.: Center of gravity
$F_n$: Barrier normal force
$F_t$: Barrier friction force
$F_x$: Force component in X direction
$F_y$: Force component in Y direction
$\mu$: Coefficient of friction
$\alpha_x$: Vehicle longitudinal pulse
$\theta$: Vehicle yaw angle
$h_1$ & $h_2$: Moment arm of $F_n$ and $F_t$ with respect to C.G., and
m & I: Vehicle 10 mass and moment of inertia.

and where $$F_x = F_n \cos 30° + F_t \sin 30° \tag{1}$$

while $$F_t = \mu F_n \tag{2}$$

and, $$F_x = ma_x, \quad F_y = ma_y. \tag{3}$$

Thus, $$F_n = \frac{ma_x}{\frac{\sqrt{3}}{2} + \frac{1}{2}\mu} \tag{4}$$

The equation of angular motion is given by $$F_n h_1 - F_t h_2 = I\ddot{\theta}. \tag{5}$$

Substituting (2) and (4) into (5) yields $$(h_1 - \mu h_2) \frac{ma_x}{\frac{\sqrt{3}}{2} + \frac{1}{2}\mu} = I\ddot{\theta}. \tag{6}$$

Rearranging (6) yields $$\ddot{\theta} = \frac{(h_1 - \mu h_2)m}{\left(\frac{\sqrt{3}}{2} + \frac{1}{2}\mu\right)I} a_x \tag{7}$$

or

-continued $$r\ddot{\theta} = a_x \quad (8)$$

where $$r = \frac{\left(\frac{\sqrt{3}}{2} + \frac{1}{2}\mu\right)l}{(h_1 - \mu h_2)m}.$$

Thus, r is a vehicle 10 dependent constant.

Applying a double integration to (8) yields $$\theta = \int\int \ddot{\theta}\,dt\,dt = \frac{1}{r}\int\int a_x\,dt\,dt. \quad (9)$$

Equilibrium in the Y direction is given by $$F_y = F_n \sin 30° - F_t \cos 30°. \quad (10)$$

Substituting (2) and (4) into (10) yields $$F_y = \frac{\left(\frac{1}{2} - \frac{\sqrt{3}}{2}\mu\right)}{\left(\frac{\sqrt{3}}{2} + \frac{1}{2}\mu\right)} ma_x. \quad (11)$$

Because $$F_y = ma_y, \quad (12)$$

$$a_y = \frac{\left(\frac{1}{2} - \frac{\sqrt{3}}{2}\mu\right)}{\left(\frac{\sqrt{3}}{2} + \frac{1}{2}\mu\right)} a_x. \quad (13)$$

Applying a double integration to both sides of (13) yields $$D_y = \int\int a_y\,dt\,dt = C\int\int a_x\,dt\,dt \quad (14)$$

where $$C = \frac{\left(\frac{1}{2} - \frac{\sqrt{3}}{2}\mu\right)}{\left(\frac{\sqrt{3}}{2} + \frac{1}{2}\mu\right)}. \quad (15)$$

Thus, $$\theta = \frac{1}{r}\int\int a_x\,dt\,dt \quad (16)$$

and $$D_y = C\int\int a_x\,dt\,dt. \quad (17)$$

(16) and (17) describe the motion of vehicle 10 in the X-Y plane, e.g., longitudinal deceleration, lateral motion, and yaw, in terms of one independent degree of freedom, e.g., $\alpha_x$.

Figure 3:
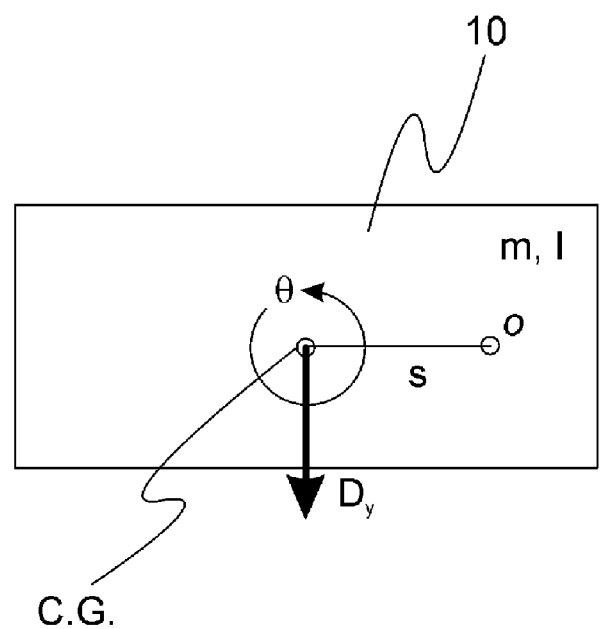
FIG. 3 shows a model of the movement of the vehicle of FIGS. 1a and 1b.

FIG. 3 shows a rigid body model of vehicle 10 using notation as described for FIG. 2 and where s: Distance between the instantaneous center of rotation, o, and the C.G.

At the C.G., the lateral velocity and angular velocity can be obtained by $$V_y = C\int a_x\,dt \quad (18)$$

and $$\dot{\theta} = \frac{1}{e}\int a_x\,dt. \quad (19)$$

At the instantaneous center of rotation, o, $$V_y = s\dot{\theta}. \quad (20)$$

Thus, $$s = rC. \quad (21)$$

Substituting C and r into (21) leads to $$s = \frac{\left(\frac{1}{2} - \frac{\sqrt{3}}{2}\mu\right)l}{(h_1 - \mu h_2)m}. \quad (22)$$

The validity of (16) and (17), as well as the values for r and C, can be determined experimentally by, for example, analyzing barrier vehicle response or structural data.

Figure 4:
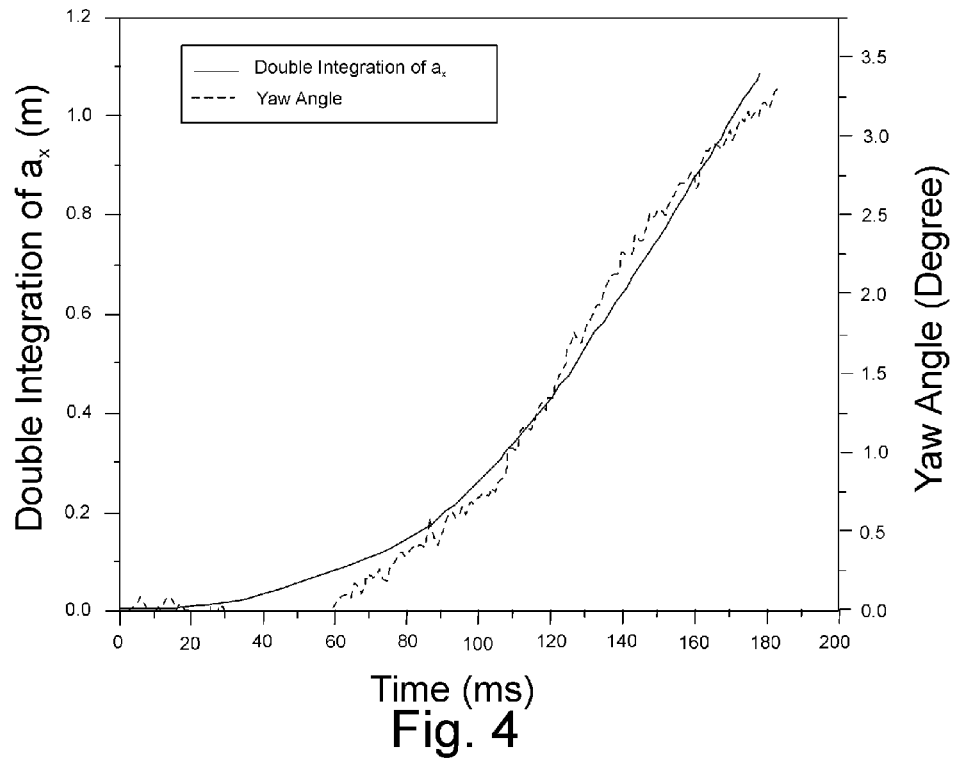
FIG. 4 shows example data used to determine the validity of derived relationships describing the movement of the vehicle of FIGS. 1a and 1b.

FIG. 4 shows a example plot of yaw angle, in degrees, and the double integration of $\alpha_x$, in meters, versus time, in milliseconds. The match between the two curves validates (16). r is equal to the ratio of the two Y-axis scales.

Figure 5:
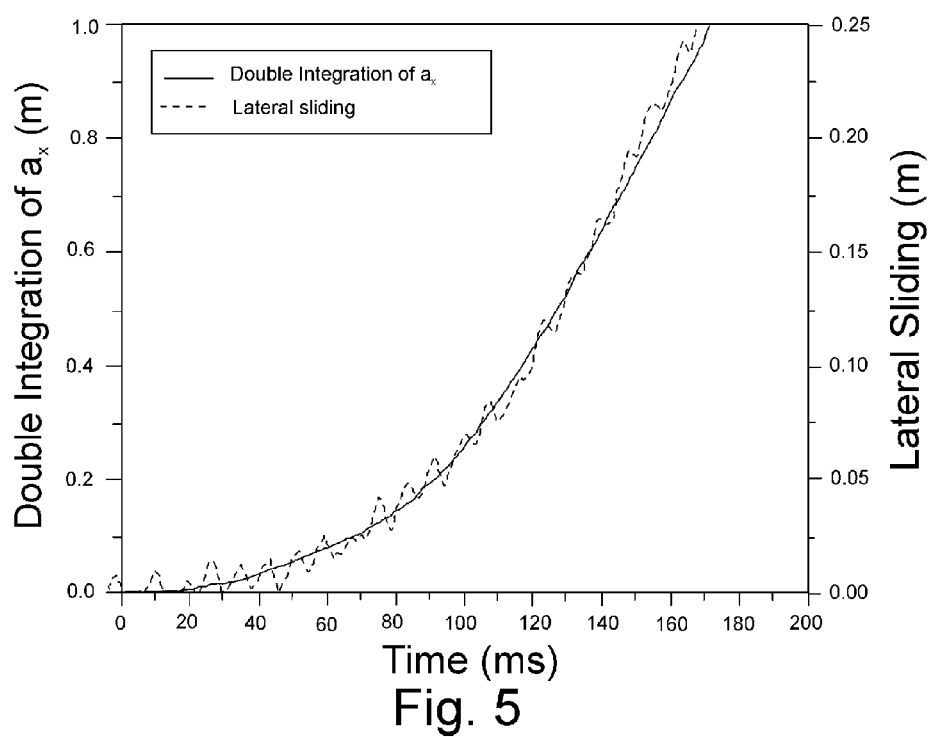
FIG. 5 shows example data used to determine the validity of derived relationships describing the movement of the vehicle of FIGS. 1a and 1b.

FIG. 5 shows a plot of lateral sliding, in meters, and the double integration of $\alpha_x$, in meters, versus time, in milliseconds. The match between the two curves validates (17). C is equal to the ratio of the two Y-axis scales.

FIGS. 6a and 6b show models of sled buck 12 and platform 14 (assuming a small θ) where $m_s$: Mass of sled buck 12 and platform 14

R: Radius of gyration about the C.G.

$I_o$: Moment of inertia about the center of rotation, o, and $a_p$: Applied acceleration on platform 14.

The equation of motion about the center of rotation, o, is given by $$m_s a_p e = I_o \ddot{\theta} \quad (23)$$

where $$I_o = m_s(e^2 + s^2 + R^2) \quad (24)$$

and the kinematic equation at the C.G. is given by $$\alpha_x = \alpha_p - e\ddot{\theta}. \quad (25)$$

(23), (24), and (25) yield $$a_p = \left(1 + \frac{e^2}{s^2 + R^2}\right) a_x \quad (26)$$

Substituting (26) into (23) yields $$a_x = \frac{s^2 + R^2}{e}\ddot{\theta}. \quad (27)$$

Also, $$\alpha_y = s\ddot{\theta}, \quad (28)$$

$$\alpha_x = r\ddot{\theta}, \quad (29)$$

and $$\alpha_y = C\alpha_x. \quad (30)$$

With (27), (28) becomes $$a_y = \frac{es}{s^2 + R^2} a_x. \quad (31)$$

To simulate impact barrier testing, $\alpha_x$, $\alpha_y$, and $\ddot{\theta}$ have to meet the requirements described in (8) and (30). Therefore, $$\frac{s^2 + R^2}{e} = r \quad (32)$$

and $$\frac{es}{s^2 + R^2} = C. \quad (33)$$

Solving (32) and (33) for e and s yields $$e = \frac{r^2 C^2 + R^2}{r}, \quad (34)$$

$$s = rC, \quad (35)$$

and $$a_p = \left(1 + \frac{e^2}{s^2 + R^2}\right) a_x. \quad (36)$$

An example given by r≈15, R≈0.5, and C≈0.25 yields
s≈4.0 m,
e≈1.0 m,
and
$a_p$≈1.05 $a_x$.

FIG. 7 shows a plan view of pivoting arm sled buck testing system 11. System 11 includes sled buck 12, platform 14, and sled carriage 16. Platform 14 is connected to carriage 16 via arms 18 at pivot 20. Pivot 20 is aligned with center of rotation, o.

Carriage 16, in response to the acceleration pulse, $a_p$, travels along carriage rails 22 in the direction of carriage axis 24. s is the longitudinal distance along axis 24 between center of rotation, o, and center of gravity, C.G. e is the lateral distance between center of rotation, o, and center of gravity, C.G.

Figure 8A:
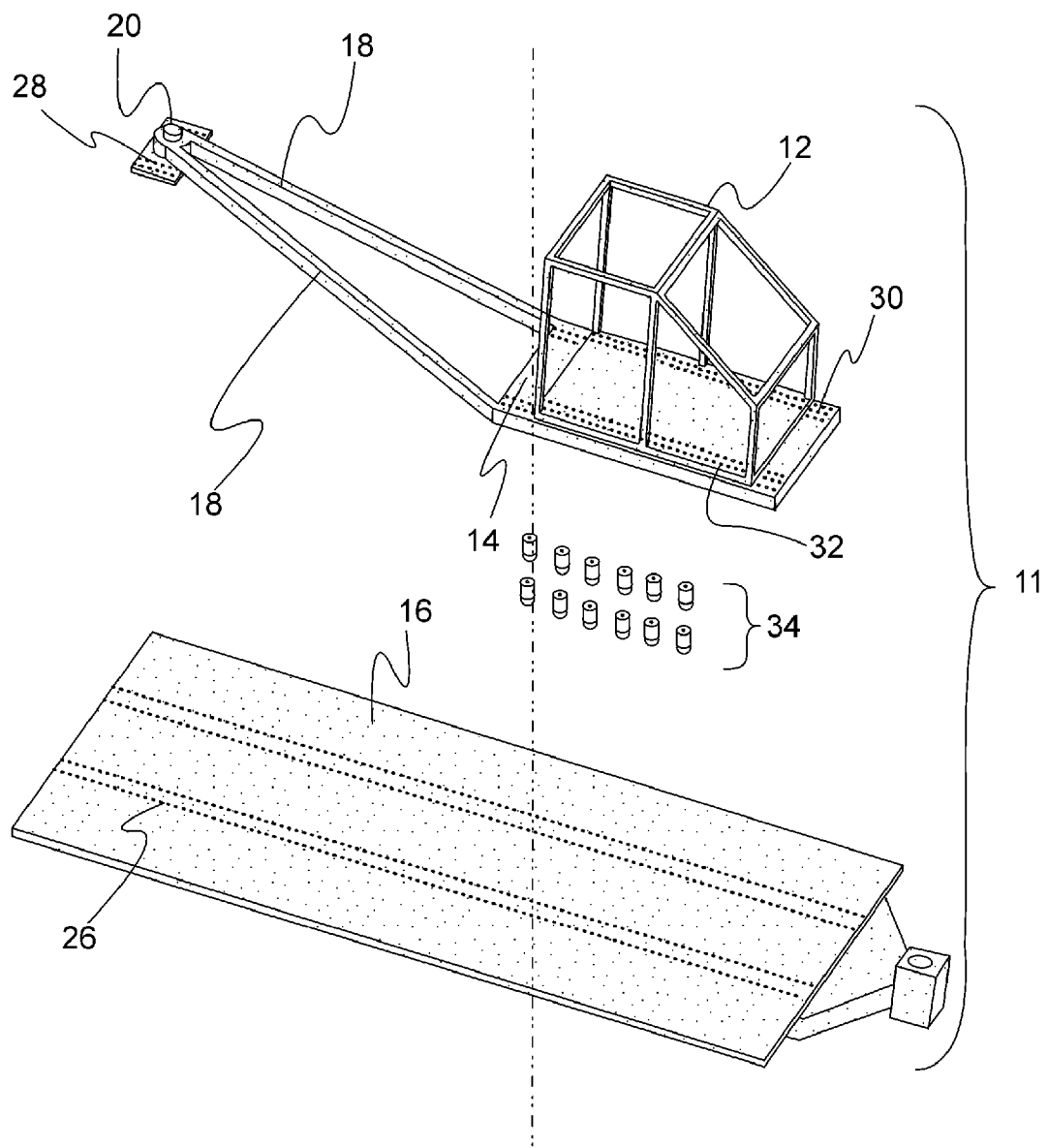
FIG. 8a shows an exploded perspective view of a the pivoting arm sled buck testing system of FIG. 7.

FIG. 8a shows an exploded view of system 11. Pivot 20 is removably attached with carriage 16 via locating holes 26, 28 respectively associated with carriage 16 and pivot 20. Pivot 20 may be bolted or otherwise attached with carriage 16 via locating holes 26, 28. Platform 14 is removably attached with sled buck 12 via locating holes 30, 32 respectively associated with platform 14 and sled buck 12. Sled buck 12 may be bolted or otherwise attached with platform 14 via locating holes 30, 32.

Rollers 34 attached with platform 14 facilitate movement between platform 14 and carriage 16.

Figure 8B:
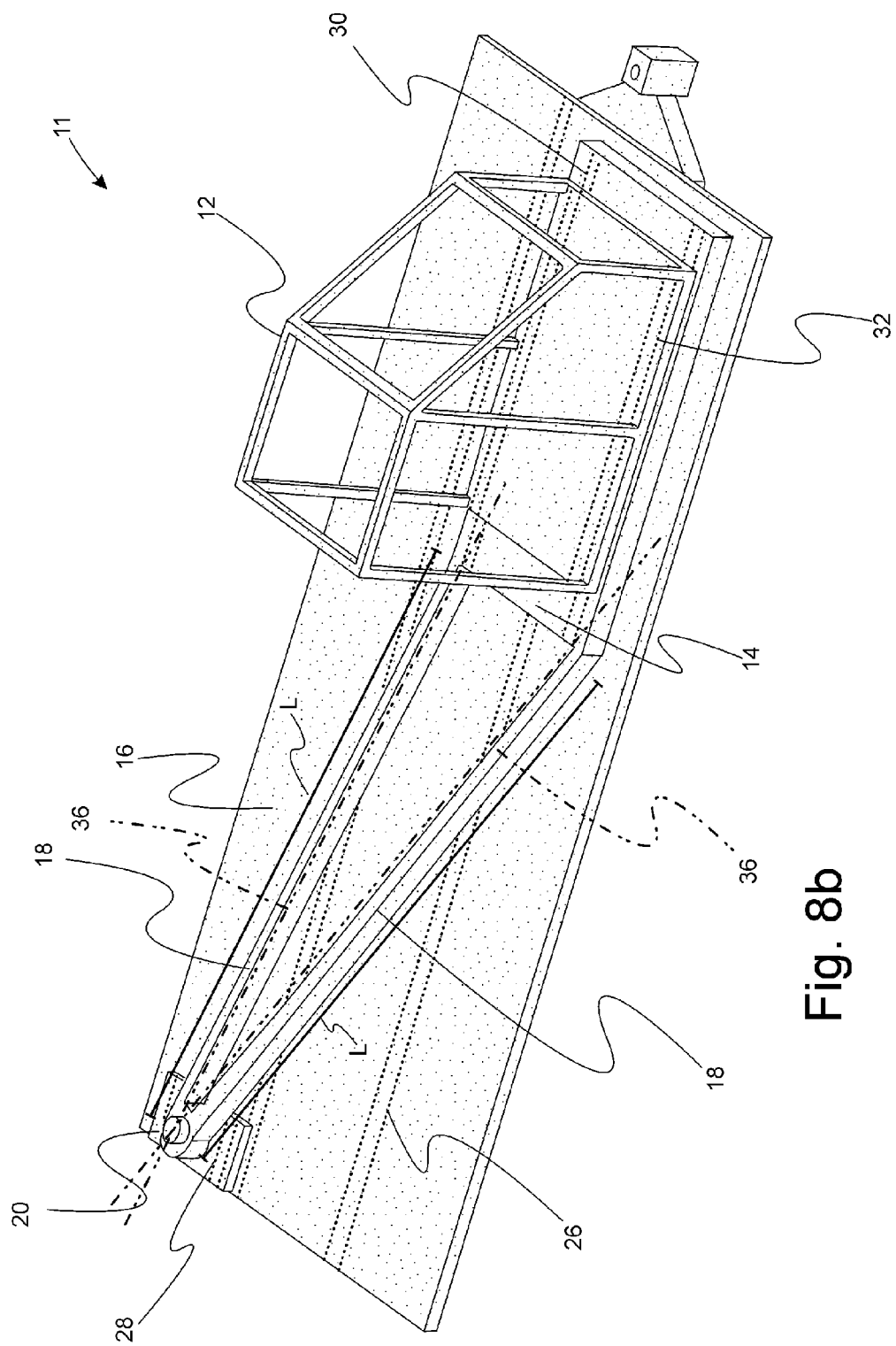

FIG. 8b shows an assembled view of system 11 of FIG. 8a. Arms 18 each include an arm axis 36. Arm axes 36 intersect at pivot 20. Arms 18 each have a respective length L. In the example of FIG. 8a, the respective lengths, L, of arms 18 are not equal.

Upon acceleration of carriage 16 by acceleration pulse, $a_p$, sled buck 12 and platform 14 will move relative to carriage 16. In particular, sled buck 12 and platform 14 will translate relative to carriage 16 as governed by (17) and sled buck 12 and platform 14 will rotate about center of rotation, o, which is aligned with pivot 20, as governed by (16).

Figure 9:
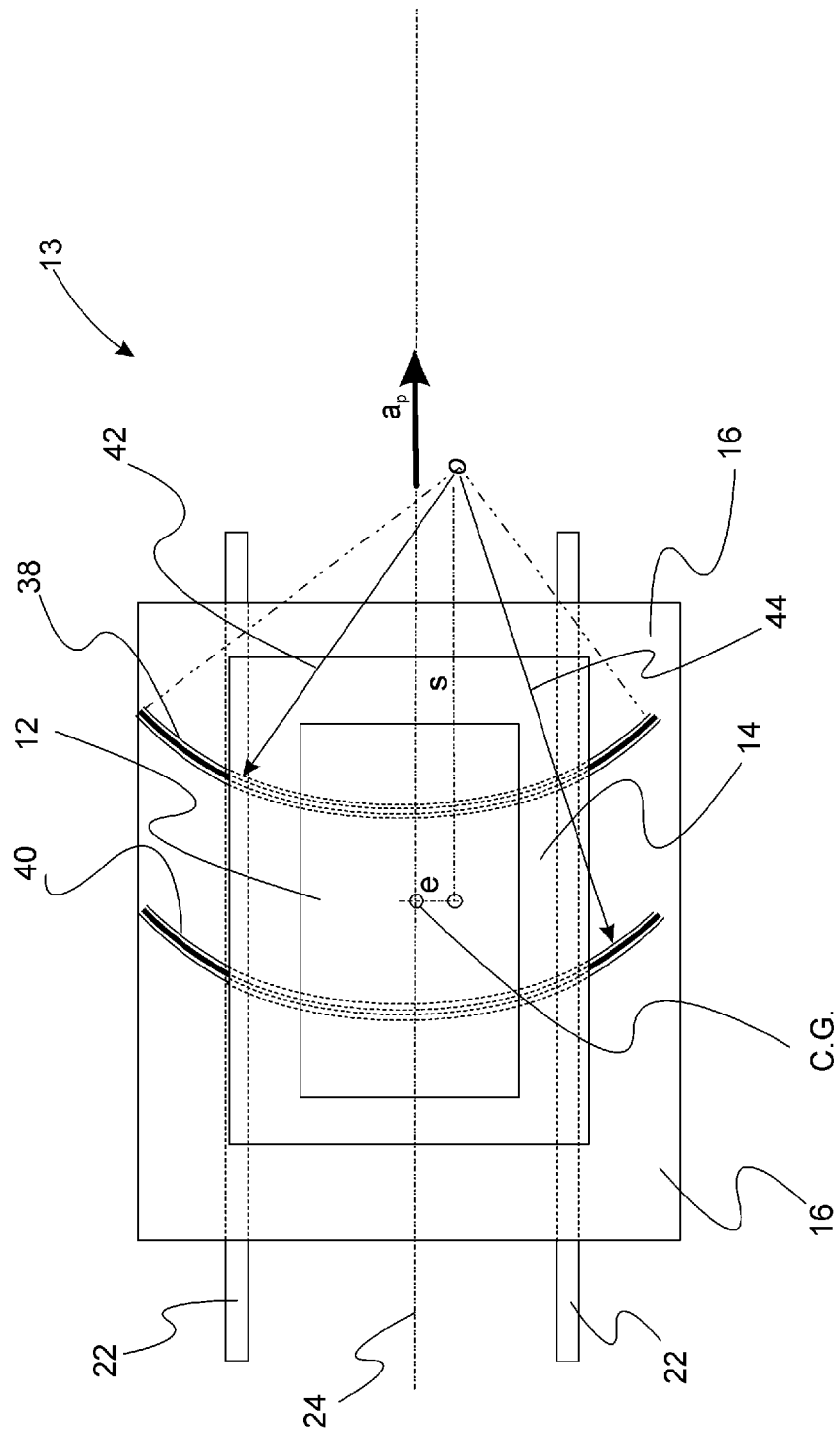
FIG. 9 shows a plan view of a curved rail sled buck testing system in accordance with an embodiment of the invention.

FIG. 9 shows a plan view of a curved rail sled buck testing system 13. System 13 includes curved rail 38 and curved rail 40. Curved rail 38 has a radius of curvature 42 whose origin is the center of rotation, o. Curved rail 40 has a radius of curvature 44 whose origin is the center of rotation, o. As described above, carriage 16 travels along carriage rails 22 in the direction of carriage axis 24 in response to an acceleration pulse, $a_p$.

Figure 10A:
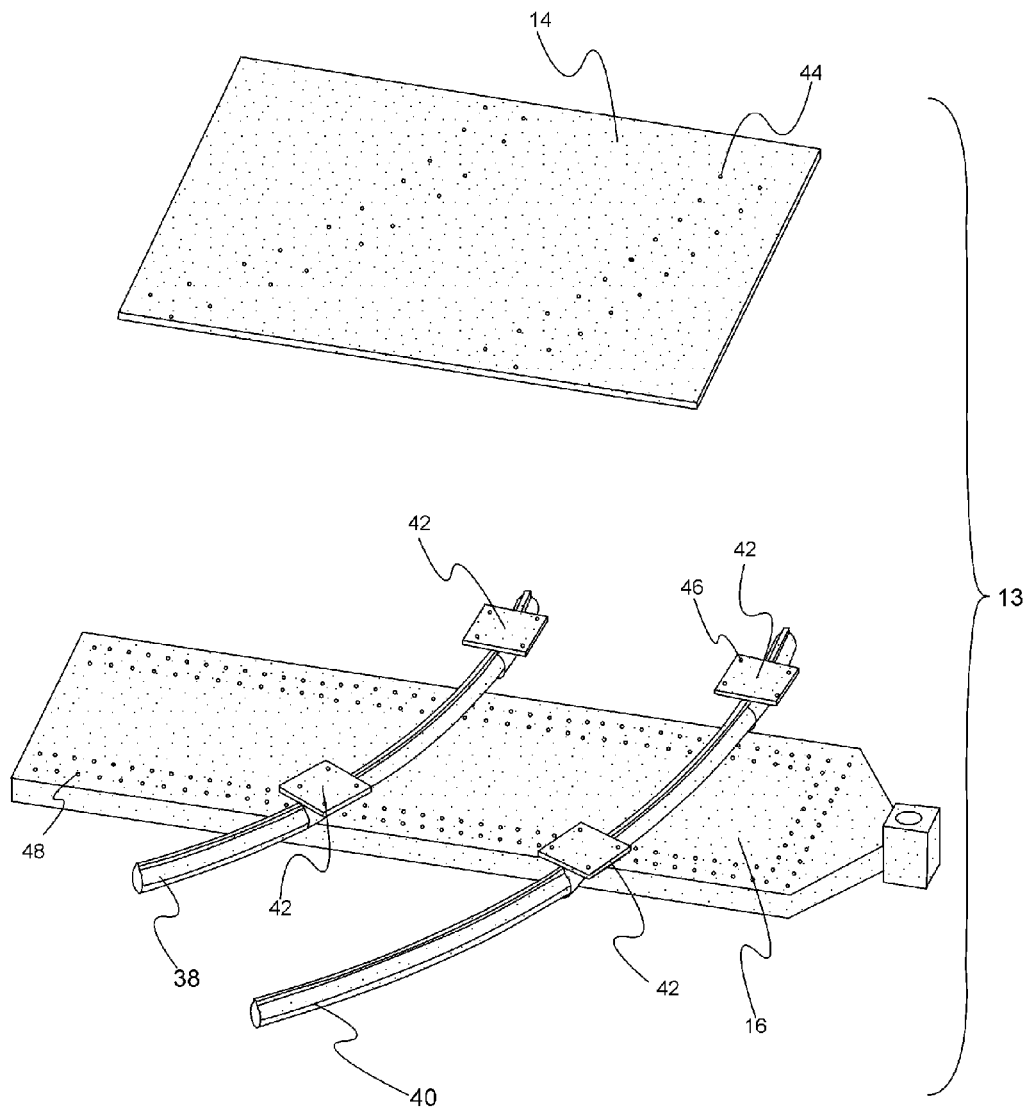
FIG. 10a shows an exploded perspective view of a portion of the curved rail sled buck testing system of FIG. 9.

FIG. 10a shows an exploded view of a portion of system 13. Sliders 42 attached with platform 14 and rails 38, 40, respectively, facilitate the movement of platform 14 relative to carriage 16. Platform 14 is removably attached with sliders 42, via locating holes 44, 46 respectively associated with platform 14 and sliders 42. Rails 38, 40 are removably attached with carriage 16 via locating holes 48. Rails 38, 40 may be bolted or otherwise connected with carriage 16 via locating holes 48.

Figure 10B:
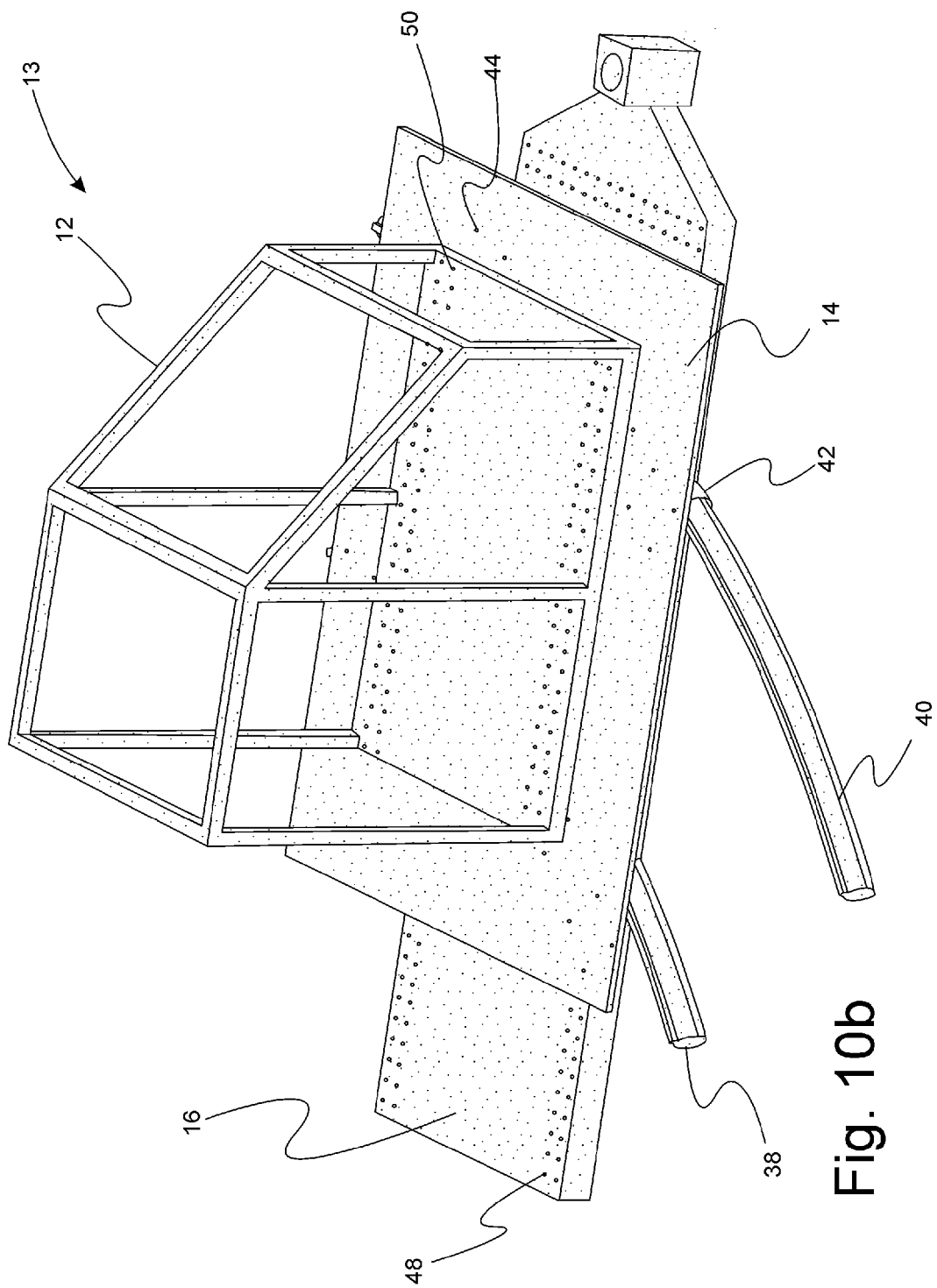

FIG. 10b shows an assembly view of system 13. Sled buck 12 includes locating holes 50 for locating sled buck 12 relative to platform 14.

Upon acceleration of carriage 16 by acceleration pulse, $a_p$, sled buck 12 and platform 14 will move relative to carriage 16. In particular, sled buck 12 and platform 14 will translate relative to carriage 16 as governed by (17) and sled buck 12 and platform 14 will rotate about center of rotation, o, relative to carriage 16 as governed by (16).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:
1. A system for sled buck testing comprising:
 a sled carriage configured to move in a direction of an axis;
 a platform disposed generally parallel to and configured to be carried by the sled carriage;
 a sled buck fixedly attached with the platform, the platform and the sled buck having a center of gravity; and
 a first arm attached with the platform and pivotally attached to the sled carriage such that, upon acceleration of the sled carriage, the sled buck and platform move across and generally parallel to the sled carriage.

2. The system of claim 1 further comprising rollers disposed between the platform and the sled carriage that facilitate the movement of the platform relative to the sled carriage.

3. The system of claim 1 wherein, upon acceleration of the sled carriage, the sled buck and platform translate in a direction different than the direction of the axis.

4. The system of claim 1 wherein, upon acceleration of the sled carriage, the sled buck and platform rotate about a predetermined center of rotation other than the center of gravity.

5. The system of claim 4 wherein the center of rotation is aligned with an attachment between the first arm and the sled carriage.

6. The system of claim 4 wherein the center of rotation, relative to the center of gravity, has predetermined longitudinal and lateral offsets.

7. The system of claim 6 wherein the longitudinal offset is the distance along the axis between the center of gravity and the center of rotation.

8. The system of claim 6 wherein the lateral offset is the distance perpendicular to the axis between the center of gravity and the center of rotation.

9. The system of claim 4 further comprising a second arm, wherein the first arm has a first arm axis and the second arm has a second arm axis, wherein the first arm axis and the second arms axis intersect at a location, and wherein the center of rotation is aligned with the location.

10. The system of claim 9 wherein the arms each have a length and wherein the lengths are not the same.

11. A sled buck system comprising:

a sled carriage;

a platform disposed generally parallel to and configured to be carried by the sled carriage;

a sled buck fixedly attached with the platform; and an arm fixedly attached with the platform and pivotally attached with the sled carriage such that, upon acceleration of the sled carriage, the sled buck and platform move across and generally parallel to the sled carriage.

* * * * *